(12) United States Patent
Liu et al.

(10) Patent No.: US 12,734,671 B2
(45) Date of Patent: Sep. 15, 2026

(54) TELESCOPING INSERTION TOOL

(71) Applicants: General Electric Company, Schenectady, NY (US); Oliver Crispin Robotics Limited, Altrincham (GB)

(72) Inventors: Chang Liu, Ho-Ho-Kus, NJ (US); Deepak Trivedi, Halfmoon, NY (US); Wayne Ray Grady, Hamilton, OH (US); Grover Andrew Bennett, Jr., Esperance, NY (US); Lokaditya Ryali, Guilderland, NY (US); Andrew Crispin Graham, Badminton (GB); Raul Montoya Blanco, Uffculme (GB)

(73) Assignees: General Electric Company, Evendale, OH (US); Oliver Crispin Robotics Limited Altrincham, Cheshire (GB)

( * ) Notice: Subject to any disclaimer, the term of this patent is extended or adjusted under 35 U.S.C. 154(b) by 12 days.

(21) Appl. No.: 18/594,161

(22) Filed: Mar. 4, 2024

(65) Prior Publication Data

US 2025/0276438 A1 Sep. 4, 2025

(51) Int. Cl.
*B25J 1/02* (2006.01)
*B25J 18/02* (2006.01)

(52) U.S. Cl.
CPC ............... *B25J 1/02* (2013.01); *B25J 18/025* (2013.01)

(58) Field of Classification Search
CPC ............ B25J 1/02; B25J 18/025; B25B 23/16
USPC ............................................ 81/177.2; 173/39
See application file for complete search history.

(56) References Cited

U.S. PATENT DOCUMENTS

| | | | | |
|---|---|---|---|---|
| 3,016,073 | A | 1/1962 | Broussard | |
| 5,762,467 | A * | 6/1998 | Sturm, Jr. | B25J 18/025 414/718 |
| 7,033,979 | B2 | 4/2006 | Herwig | |
| 7,340,814 | B2 | 3/2008 | Bruehwiler | |
| 8,028,936 | B2 | 10/2011 | Mcdermott | |
| 8,267,188 | B2 | 9/2012 | Nicholson | |
| 8,277,647 | B2 | 10/2012 | Rice | |
| 8,789,447 | B2 | 7/2014 | Kozak | |
| 9,138,782 | B2 | 9/2015 | Dorshimer | |

(Continued)

FOREIGN PATENT DOCUMENTS

| | | | |
|---|---|---|---|
| CN | 114851180 | A | 8/2022 |
| DE | 102013202616 | A1 | 8/2014 |

(Continued)

OTHER PUBLICATIONS

U.S. Appl. No. 18/230,558, filed Aug. 4, 2023, entitled "Rigidizable Insertion Tool".

*Primary Examiner* — Kristina N Junge
(74) *Attorney, Agent, or Firm* — Fitch, Even, Tabin & Flannery LLP

(57) ABSTRACT

An insertion tool is provided. The tool includes an insertion portion, a telescoping link, a joint actuation assembly, and an extension actuator. The telescoping link having a base part and an extension part, the extension part being configured to slide longitudinally relative to the base part from a retracted state to an extended state. The joint actuation assembly is configured to change an angle between the base part of the telescoping link and the insertion portion via a joint. The extension actuator is configured to actuate the extension part of the telescoping link from the retracted state to the extended state.

14 Claims, 14 Drawing Sheets

(56) References Cited

U.S. PATENT DOCUMENTS 9,739,168 B2 8/2017 Ekanayake
9,789,549 B2 10/2017 Nguyen
9,926,517 B2 3/2018 Tibbetts
9,932,854 B1 4/2018 Tibbetts
9,951,647 B2 4/2018 Rawson
9,957,066 B2 5/2018 Bewlay
10,005,111 B2 6/2018 Eriksen
10,018,113 B2 7/2018 Bewlay
10,227,891 B2 3/2019 Eriksen
10,323,539 B2 6/2019 Bewlay
10,377,968 B2 8/2019 Brooks
10,385,723 B2 8/2019 Flynn
10,634,004 B2 4/2020 Giljohann
10,669,885 B2 6/2020 Pecchiol
10,920,181 B2 2/2021 Martin
11,027,317 B2 6/2021 Tibbetts
11,161,181 B2 11/2021 Fielding
11,441,446 B2 9/2022 Rawson
11,511,443 B2 11/2022 Crivella
2015/0159122 A1 6/2015 Tibbetts
2017/0165721 A1 6/2017 Tibbetts
2017/0167290 A1 6/2017 Kulkarni
2017/0191376 A1 7/2017 Eriksen
2017/0204739 A1 7/2017 Rawson
2017/0254217 A1 9/2017 Eriksen
2018/0149038 A1 5/2018 Eriksen
2018/0155060 A1 6/2018 Dauenhauer
2018/0216036 A1 8/2018 Tibbetts
2018/0237163 A1 8/2018 Bewlay
2018/0245477 A1 8/2018 Kulkarni
2018/0258787 A1 9/2018 Tibbetts
2018/0291803 A1 10/2018 Belay
2018/0298781 A1 10/2018 Tibbetts
2018/0313225 A1 11/2018 Millhaem
2018/0355751 A1 12/2018 Tibbetts
2019/0153890 A1 5/2019 Eriksen
2019/0323378 A1 10/2019 Tibbetts
2020/0114497 A1* 4/2020 Graham .................... B25J 9/06
2021/0094105 A1 4/2021 Schwab
2021/0108537 A1 4/2021 Rigg
2021/0317752 A1 10/2021 Deja
2022/0221706 A1 7/2022 Trivedi
2022/0221707 A1 7/2022 Trivedi

FOREIGN PATENT DOCUMENTS

DE 102015006330 11/2016
DE 202022105802 U1 12/2022
WO 2014031955 A1 2/2014
WO 2020022474 A1 1/2020
WO 2020030516 A1 2/2020

* cited by examiner

TELESCOPING INSERTION TOOL

FIELD

The present subject matter relates generally to an insertion tool for a confined space, and particularly to a telescoping insertion tool.

BACKGROUND

Insertion tools have applications in various industries. The tools can be used for inspection, manufacturing, servicing, and the like. The effectiveness of these tools often depends on their ability to reach difficult areas. In aviation, insertion tools are used to inspect, service, and/or repair assembled engines through annular openings.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figures 1, 2A:
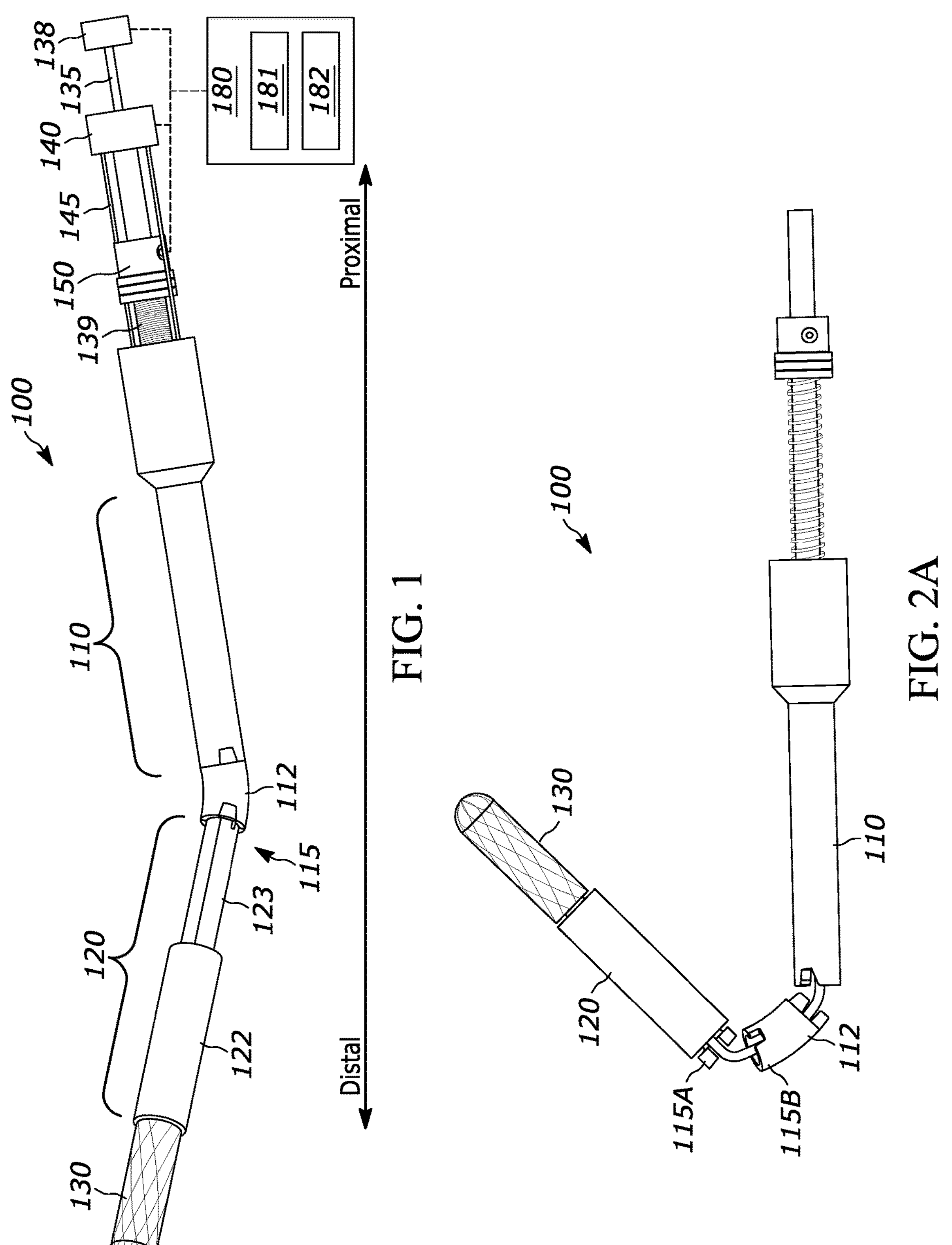
FIG. 1 is a perspective view of an insertion tool with a telescoping link in accordance with some embodiments.
FIGS. 2A, 2B, and 2C are perspective views of the insertion tool of FIG. 1 in relaxed and rigidized states in accordance with some embodiments.

Repeat use of reference characters in the present specification and drawings is intended to represent the same or analogous features or elements of the present disclosure.

DETAILED DESCRIPTION

Reference now will be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Moreover, each example is provided by way of explanation of the invention, not limitation of the disclosure. In fact, it will be apparent to those skilled in the art that various modifications and variations can be made in the present disclosure without departing from the scope of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first," "second," "third," etc. may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In some aspects, an insertion tool with a telescoping link is described herein. The insertion tool is configured to permit an operator or robotic assembly to perform an operation (e.g., inspect, service, and/or repair) on a workpiece within a cavity, such as an internal volume of a gas turbine engine. The insertion tool can include a flexible section that is selectively rigidizable to permit a tip of the insertion tool access to the confined cavity of the equipment through a complex pathway. In some aspects, a telescoping insertion tool described herein provides an additional degree of freedom for positioning and operations of the tool.

For example, the insertion tool may be a tool for performing an operation (e.g., drilling a hole, grinding, polishing, etc.) during internal inspection or repair of turbo machinery on an aircraft or removed for service and/or maintenance. In some embodiments, the tool can be inserted through an access port of varying sizes, navigate to a target location, reconfigure to the desired rigid state, and telescope to access the target workpiece. The telescoping link allows the tool to extend in along axis that can be different than the tool insertion axis. The additional degree of freedom is particularly advantageous since, when accessing a confined space, the target location may not always align with the access port. In some embodiments, the telescoping mechanism, linear or nonlinear, is provided to push an end effector out to perform the desired task, such as drilling and grinding.

In some embodiments, the insertion tool includes a flexible portion coupled to the telescoping link. In some embodiments, the flexible portion is rigidizable and may include one or more rigidizable segments. When the links are not tensioned, the tool is flexible so that it can be inserted and removed through the small access port without getting stuck. Once in position, the links can be rigidized so that the tool has sufficient stiffness for operation. In some embodiments, a flexible shaft runs through the tool and drives the end effector (e.g., a bur for a drilling/grinding operation).

The telescoping link can be actuated via one or more methods and mechanisms described herein, such as (a) pushed out by nitinol wires, (b) spring-loaded mechanism, (c) tendon-driven mechanism, (d) pneumatics driven mechanism, (e) a screw driven by a flex shaft, etc. In some embodiments, two parts of a telescoping link may be mated with a screw and incorporate a specific amount of friction at the bur support bearing, so that the bur drive flex shaft also drives the screw to extend. In some embodiments, reversing the drive retracts the telescoping link. In some embodiments, the telescoping link may be driven by a linear motor, which is configured to move two nested arcs and/or nested linear shafts of the telescoping link.

Referring now to the drawings, wherein identical numerals indicate the same elements throughout the figures.

FIG. 1 illustrates a perspective view of an insertion tool 100 in accordance with some embodiments in an extended state. In some embodiments, the tool 100 can define a complex geometry extending through a three-dimensional cartesian coordinate system. That is, the tool 100 may simultaneously extend in the X-, Y-, and Z-axis along its length from the proximal to the distal end. The particular shape of the tool 100 can be configured based on the shape of the environment within which the tool is to be used. In some embodiments, in the non-rigidized state, the tool 100 may be inserted through complex passageways such as ports and cavities of a jet engine. Once the tool 100 is inserted into position, the tool 100 may be rigidized to position the tip of the tool at the desired location and orientation to allow for inspection, servicing and/or repair of a part such as an engine component. The tool 100 includes an insertion portion 110 and a telescoping link 120 coupled to an end effector 130. As used herein, the end of the insertion tool 100 that couples the end effector 130 is referred to as the distal end and the opposite end is referred to as the proximal end. Generally, the insertion tool 100 is inserted with the distal end first, while at least a portion of the proximal end may remain outside of the confined space during operations of the insertion tool 100 on the workpiece.

The insertion portion 110 generally comprises an elongated member that is flexible during the insertion of the tool. In some embodiments, the insertion portion 110 includes one or more rigidizable segments 112, and the insertion tool 100 includes a joint actuation assembly 140 or a separate rigidization actuator that is configured to tension the one or more rigidizable segments 112 of the insertion portion 110. For example, the joint actuation assembly 140 or a separate rigidization actuator may include pull ropes configured to pull the telescoping link 120 and/or one or more segments 112 of the insertion portion 110 into a rigidized state. In some embodiments, the insertion portion 110 includes a rigidizable guide tube or a snake arm robot. In some embodiments, insertion portion 110 may be magnetically and/or pneumatically rigidized. While only one segment 112 is illustrated in FIG. 1, the insertion tool 100 can include a plurality of segments 112 that may be selectively and individually rigidized. The joint actuation assembly 140 and/or a separate rigidization actuator may be configured to cause the insertion portion 110 and/or a joint 115 between the insertion portion 110 and the telescoping link 120 to take a predefined shape/angle. In some embodiments, the insertion portion 110 includes one or more segments as described in U.S. Patent Application Publication US2022/0221706A1, titled "Insertion Tool," the entirety of which is incorporated herein by reference.

Figures 2B, 2C:
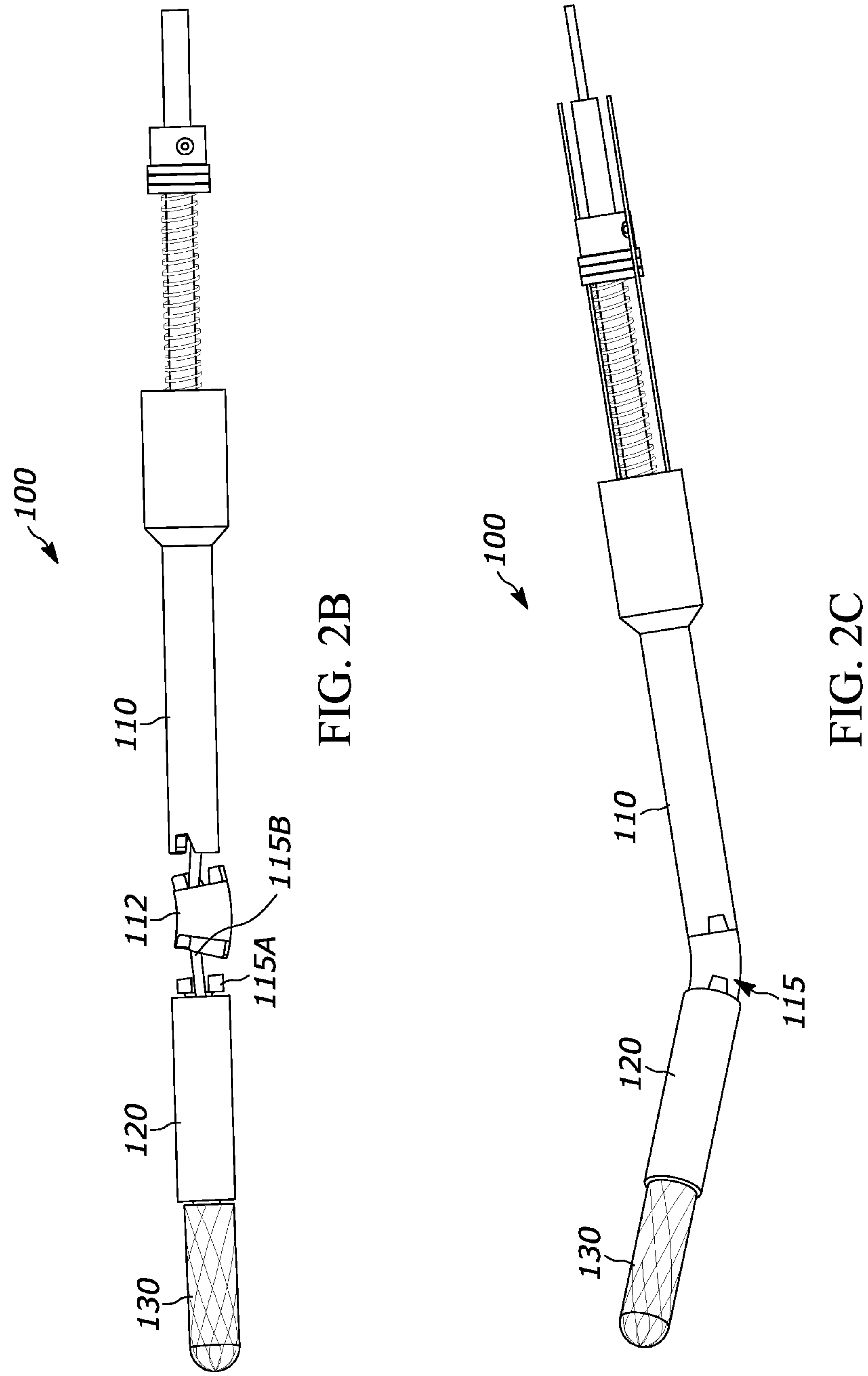

FIGS. 2A and 2B illustrate the tool 100 of FIG. 1 in a non-rigidized or relaxed state. In the non-rigidized state, the insertion portion 110, including the segments 112, can be bent into various shapes to allow insertion into a confined space such as cavities within a turbine engine. The joint 115 (formed of first interface 115A and second interface 115B) between the telescoping link 120 and the insertion portion 110 can also be bent at many angles to allow for the maneuvering of the end effector 130 to a service location.

A shown in FIG. 1, the proximal end of the tool 100 may include one or more elements configured to permit selective rigidization of the tool 100. For example, the handle can include a joint actuation assembly 140 configured to cause the tensioning of a rope assembly 145 to pull the telescoping link 120 and the segments 112 toward the proximal end to selectively rigidize the tool 100. In some embodiments, the insertion portion 110, including the segments 112, may include guide paths for the rope assembly 145 such that the rope assembly 145 may slide within the insertion portion 110. In some embodiments, the joint actuation assembly 140 may include a trigger on a handle. The trigger can be rotatable, pivotal, translatable, or the like between a disengaged configuration in which the tool 100 is flaccid, i.e., non-rigidized, and an engaged configuration in which the tool 100 is rigid. Accordingly, the operator can rigidize the tool 100 and release the trigger during servicing operations. In yet a further embodiment, the trigger can be operated by a motor or other power device such that rigidization of the tool 100 does not require the generation of manual pressure. The proximal end of the tool 100 may remain outside the engine while the tool 100 is inserted in the engine. In such a manner, the operator can maintain control of the tool 100 without direct access thereto. In some embodiments, the joint actuation assembly 140 is configured to rigidize both the insertion portion 110 and the joint 115 between the insertion portion 110 and the telescoping link 120. In some embodiments, a separate rigidization assembly may be provided to rigidize the insertion portion 110. For example, the tool 100 may include a second rope assembly for tensioning segments 112 of the insertion portion 110.

The telescoping link 120 includes a base part 123 and an extension part 122. As used herein, the extension part 122 generally refers to the movable part that is on the distal end of the telescoping link 120 when extended. The extension part 122 being configured to slide longitudinally relative to the base part 123 from a retracted state to an extended state. In FIG. 1, the telescoping link 120 is shown in the extended state. In FIG. 1, the base part 123 has a smaller outer diameter as compared to the extension part 122, and the base part 123 is at least partially nested within the extension part

122 in the retracted state and the extended state. In some embodiments, however, the base part 123 has a larger outer diameter as compared to the extension part 122, and the extension part 122 is at least partially nested within the base part 123 in the retracted state and the extended state. In some embodiments, the telescoping link 120 includes a plurality of extension parts 122 each configured to slide and extend out of the base part 123 or another extension part 122.

As shown in FIG. 1, the telescoping link 120 is coupled to an extension actuator 150 configured to actuate the extension part 122 of the telescoping link 120 from the retracted state to the extended state. In some embodiments, the telescoping link 120 may be linear or curved. In some embodiments, the telescoping link 120 may be actuated by linearly sliding the extension part 122 via a spring-loaded mechanism, a pneumatic or hydraulic mechanism, inverted wire ropes, superelastic wires, etc. In some embodiments, the extension part 122 may non-linearly slide relative to the base part 123. For example, the extension part 122 may slide at an angle or at a curve relative to the base part 123. In some embodiments, the telescoping link 120 may include parts mated with a threaded interface (e.g., screw) and driven by a flexible shaft. In some embodiments, the telescoping link 120 may include two parts mated with threaded interface and incorporate a specific amount of friction at the bur support bearing, such that the rotation of an end effector connector 135 that transfers torque to cause the rotation of the end effector 130 also drives the screw to extend and retract the telescoping link 120. While FIG. 1 illustrates the telescoping link 120 as the tip link coupled to the end effector 130, in some embodiments, the telescoping link 120 may be a segment/link within the insertion portion 110.

Several embodiments of the telescoping link 120 and extension actuator 150 are described in further detail with reference to FIGS. 7A to 12B herein. In some embodiments, the telescoping link 120 includes an anti-rotation feature that prevents the extension part 122 from rotating relative to the joint 115 when the end effector 130 carried by the extension part 122 is driven to rotate. Examples of anti-rotation features are described with reference to FIGS. 13A, 13B, and 13C herein. While a generally linear telescoping link is shown, in some embodiments, the telescoping link may be linear or curved.

As shown in FIG. 1, the telescoping link 120 is connected to the insertion portion 110 via a joint 115 coupled to a joint actuation assembly 140. The joint 115 may be formed by a first interface 115A on the telescoping link 120 and a second interface 115B on a segment 112 of the insertion portion 110 as shown in FIGS. 2A and 2B. The joint actuation assembly 140 is configured to change an angle between the base part 123 of the telescoping link 120 and the insertion portion 110 via the joint 115. In some embodiments, the joint actuation assembly 140 includes a rigidization actuator configured to actuate the joint 115 between rigidized and unrigidized states. For example, the joint may be a joint of a rigidizable guide tube. In some embodiments, the joint 115 may include one or more flexible elements or hinges that may be actuated between rigidized and relaxed states. In some embodiments, the joint 115 may be an actively controlled joint that is electrically, mechanically, or pneumatically actuated by the joint actuation assembly 140 to a select angle or angles during insertion to maneuver through the insertion path. For example, the joint 115 may be a joint of a snake arm robot.

A rigidizable joint according to some embodiments is illustrated in FIGS. 1 and 2A-C. When the joint 115 is not rigidized, as shown in FIGS. 2A and 2B, the first interface 115A and second interface 115B are not engaged (e.g., spaced apart, not touching, or touching but not tensioned). The telescoping link 120 and the insertion portion 110 are connected via flexible elements (e.g., tension ropes, flexible shaft, etc.) inserted through the insertion portion 110 which allows the angle between the telescoping link 120 and the insertion portion 110 to change based on the shape of the insertion path. In some embodiments, the angle may change up to 90, 180, or 360 degrees with one, two, or three degrees of freedom. When the joint 115 is rigidized, as shown in FIGS. 1 and 2C, the joint 115 forms a predefined angle between the telescoping link 120 and the insertion portion 110.

Figure 5A:
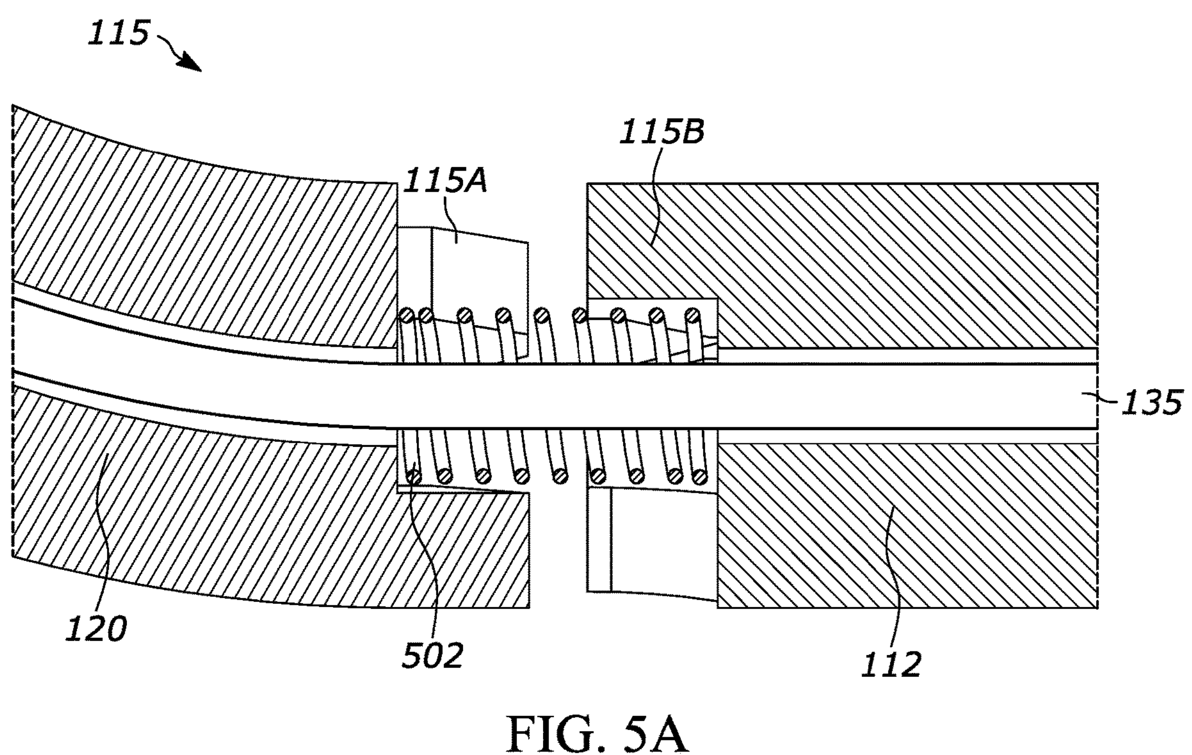
FIG. 5A and FIG. 5B are illustrations of a rigidizable joint according to some embodiments.
Figure 5B:
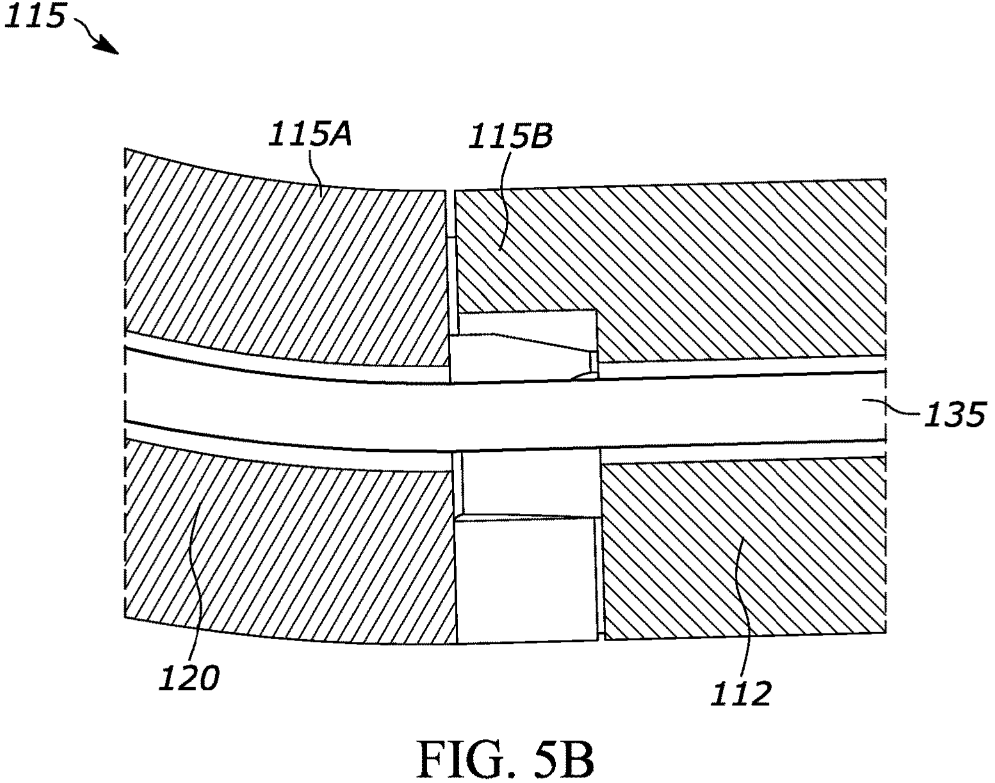

FIGS. 5A and 5B illustrate a rigidizable joint according to some embodiments in further detail. The joint 115 as shown in FIGS. 5A and 5B includes features on the first interface 115A of the telescoping link 120 that are configured to be engaged with features on the second interface 115B of the segments 112. In the unrigidized state, as shown in FIG. 5A, the features on the first interface 115A and the second interface 115B are not engaged, which enables telescoping link 120 to bend and move relative to the segments 112, but is still constrained by the end effector connector 135 inserted through the segments. In some embodiments, the joint 115 further includes a compression spring 502 that asserts a force to push the telescoping link 120 and the segments 112 apart such that the joint 115 is unrigidized when a tensioning force is not applied. As shown in FIG. 5B, when a tensioning force is applied (e.g., by a tension rope assembly), the telescoping link 120 and segments 112 are pushed or pulled together such that the features on the first interface 115A and second interface 115B engage to limit the relative rotation and bending between the telescoping link 120 and the extension part 122. As such, when actuated, the joint 115 may limit the relative motion of the base part 123 (FIG. 1) of the telescoping link 120 and the distal end of the insertion portion 110. FIGS. 5A and 5B illustrate one example of a joint 115 only. In some embodiments, the joint 115 may be a hinge, a powered hinge, a pneumatically driven connector, etc. In some embodiments, joint actuation assembly 140 may be configured to actuate the joint between two or more states (e.g., flexible and rigidized) or configured to actuate the joint to a plurality of angles and orientations.

Figure 6:
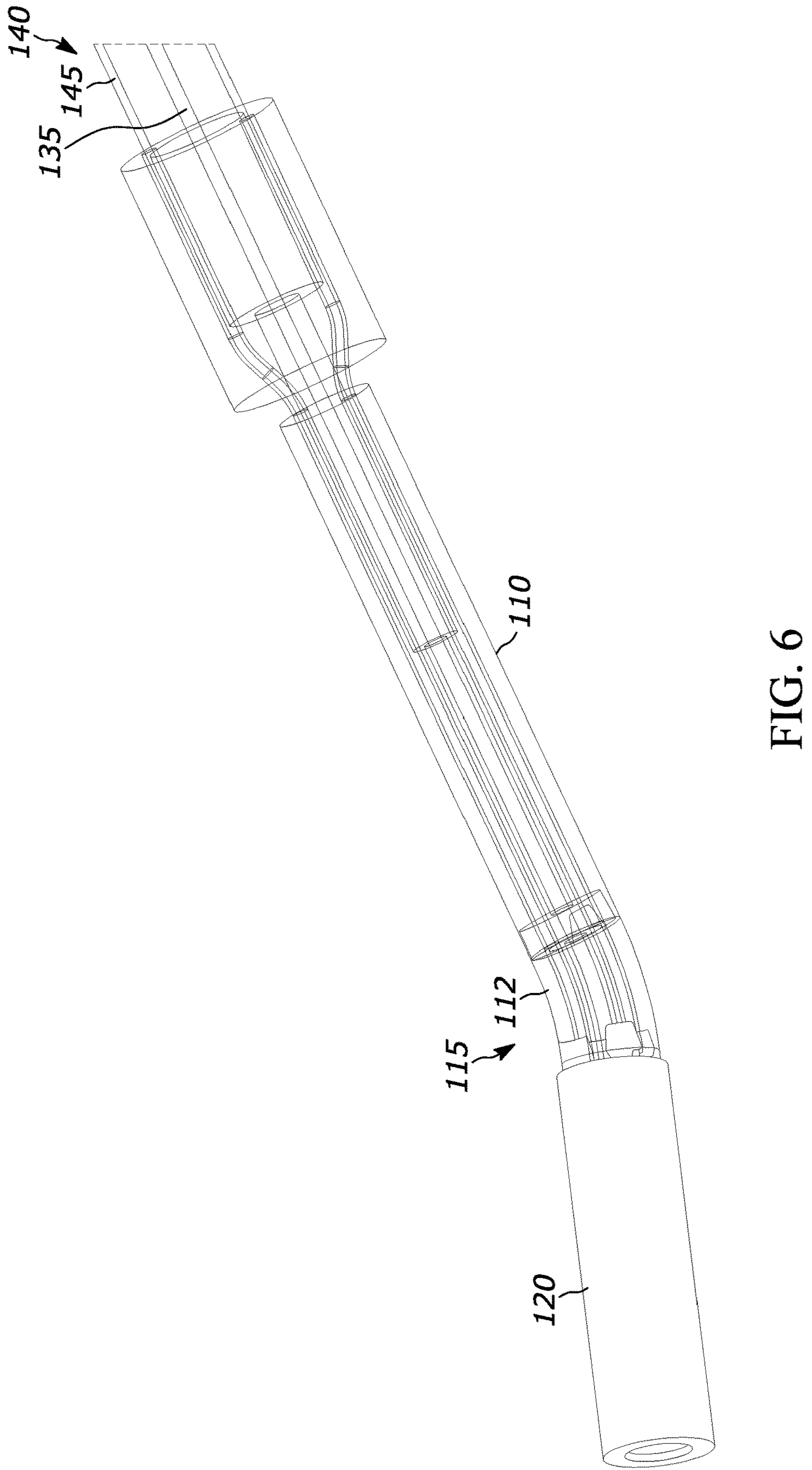
FIG. 6 illustrates a joint actuator according to some embodiments.

FIG. 6 illustrates a joint actuator assembly 140 including a rope assembly 145 according to some embodiments. The tensioning rope assembly 145 is inserted through the insertion portion 110, including the segments 112 and connected to the telescoping link 120. When a force is applied to pull the rope assembly 145, the joint 115 rigidizes to position the telescoping link 120 at a predetermined angle and orientation relative to the segments 112. In some embodiments, the rope assembly 145 also rigidizes the segments 112 of the insertion portion 110 to cause the insertion portion 110 to take a predefined shape and prevent the rotation of the telescoping link 120 and segments 112 when torque is applied to rotate the end effector 130 (FIG. 1).

Figures 4A, 4B:
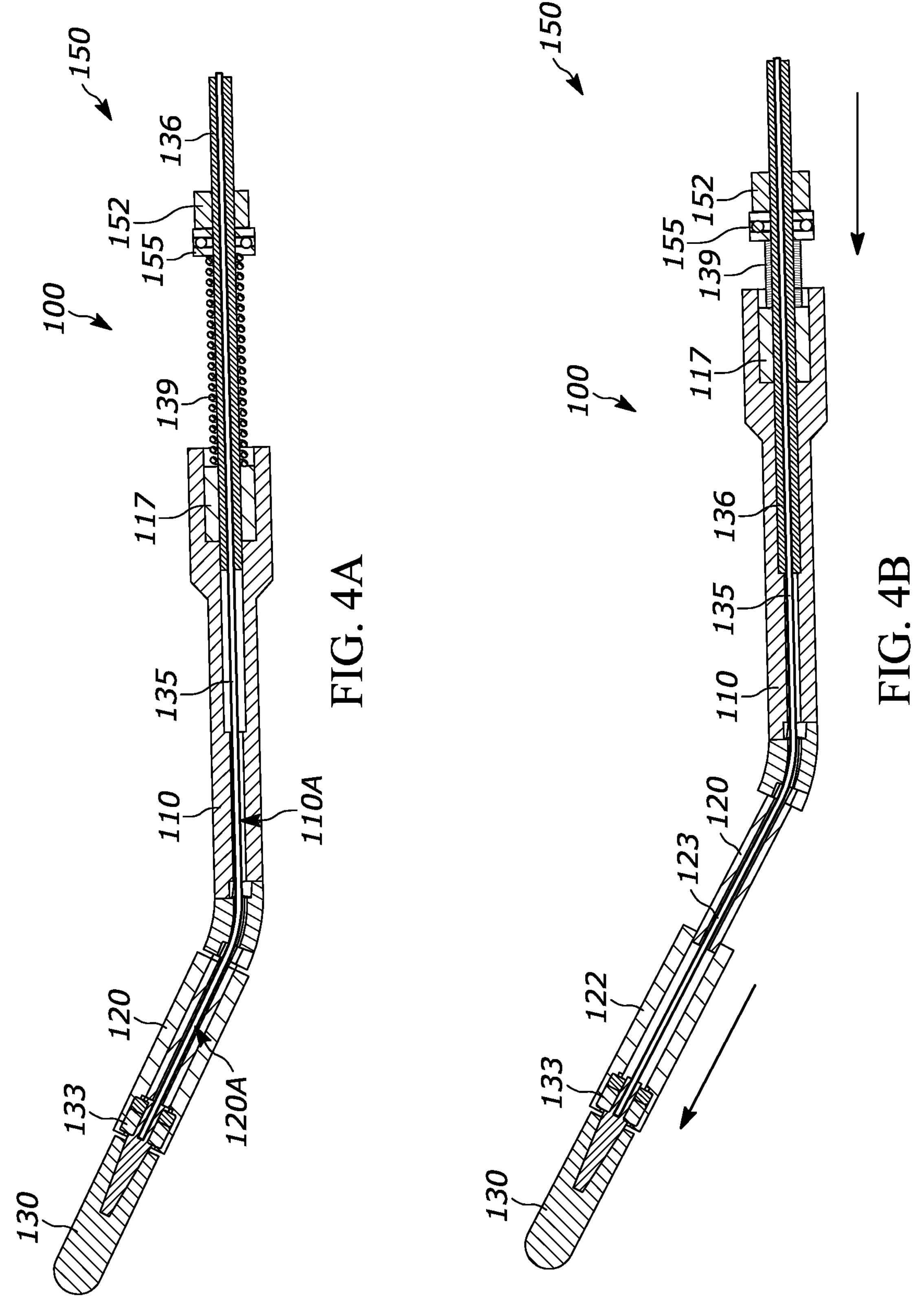
FIG. 4A and FIG. 4B are cross-sectional views of the insertion tool of FIG. 1 in accordance with some embodiments.

As shown in FIG. 1, the end effector 130 includes an effector coupled to the distal end of the tool 100. In some embodiments, the end effector 130 is coupled to the extension part 122 of the telescoping link 120. In some embodiments, the end effector 130 includes one or more of a brush, a drill, a burr, a grinding tool, a cutting tool, a polishing tool, a profiling tool, a bore-blending tool, a cleaning tool, an imaging tool, etc. In some embodiments, the end effector 130 may be a titanium 3D printed part with 6 mm to 8 mm diameter. In some embodiments, the imaging tool may include a nondestructive testing tool such as an eddy current sensor, or an ultrasound imager. In some embodiments, the end effector 130 is a rotating end effector driven by an end effector actuator 138. In some embodiments, an end effector connector 135 is inserted through a first hole 110A (e.g., cable guide or shaft guide) in the insertion portion 110 and a second hole 120A in the telescoping link 120 and coupled to the end effector 130 as shown in FIG. 4A. In some embodiments, the end effector connector 135 includes a flexible shaft for selectively transmitting torque from the end effector actuator 138 to the end effector 130. In some embodiments, the end effector connector 135 may include one or more of a flexible cable (e.g., fiber-optic cable), a soft fluid tube, or an electrical wire connector. In some embodiments, the end effector actuator 138 may include a motor for providing a force via the end effector connector 135 to drive the rotation of the end effector 130.

In some embodiments, as shown in FIG. 1, the tool 100 further includes a connector tension controller 139 for affecting a tension of the end effector connector 135 within the insertion portion 110 and the telescoping link 120. In some embodiments, the connector tension controller 139 may include a spring-loaded mechanism, a linear motor, a pneumatic artificial muscle device, a piezo-electric motor, etc. When the insertion portion 110 is tensioned such that the distance between the proximal end and distal end of the insertion portion 110 shortens, the connector tension controller 139 may pull the end effector connector 135 out of the insertion portion 110 to maintain the tension of the end effector connector 135 within the insertion portion 110. In some embodiments, when the telescoping link 120 is extended, the extension actuator 150 may reduce the tension in the end effector connector 135 to allow for the extension.

In FIG. 1, the end effector actuator 138, the joint actuation assembly 140, and the extension actuator 150 are illustrated as blocks for simplicity. The end effector actuator 138, the joint actuation assembly 140, and the extension actuator 150 may take on a number of form factors, such as manually operated triggers/switches, motors, electrically driven devices, pneumatic devices, etc. In some embodiments, the end effector actuator 138, the joint actuation assembly 140, and the extension actuator 150 may be controlled via a shared control circuit such as a user-operated control unit or a robotic controller.

Figures 3A, 3B, 3C:
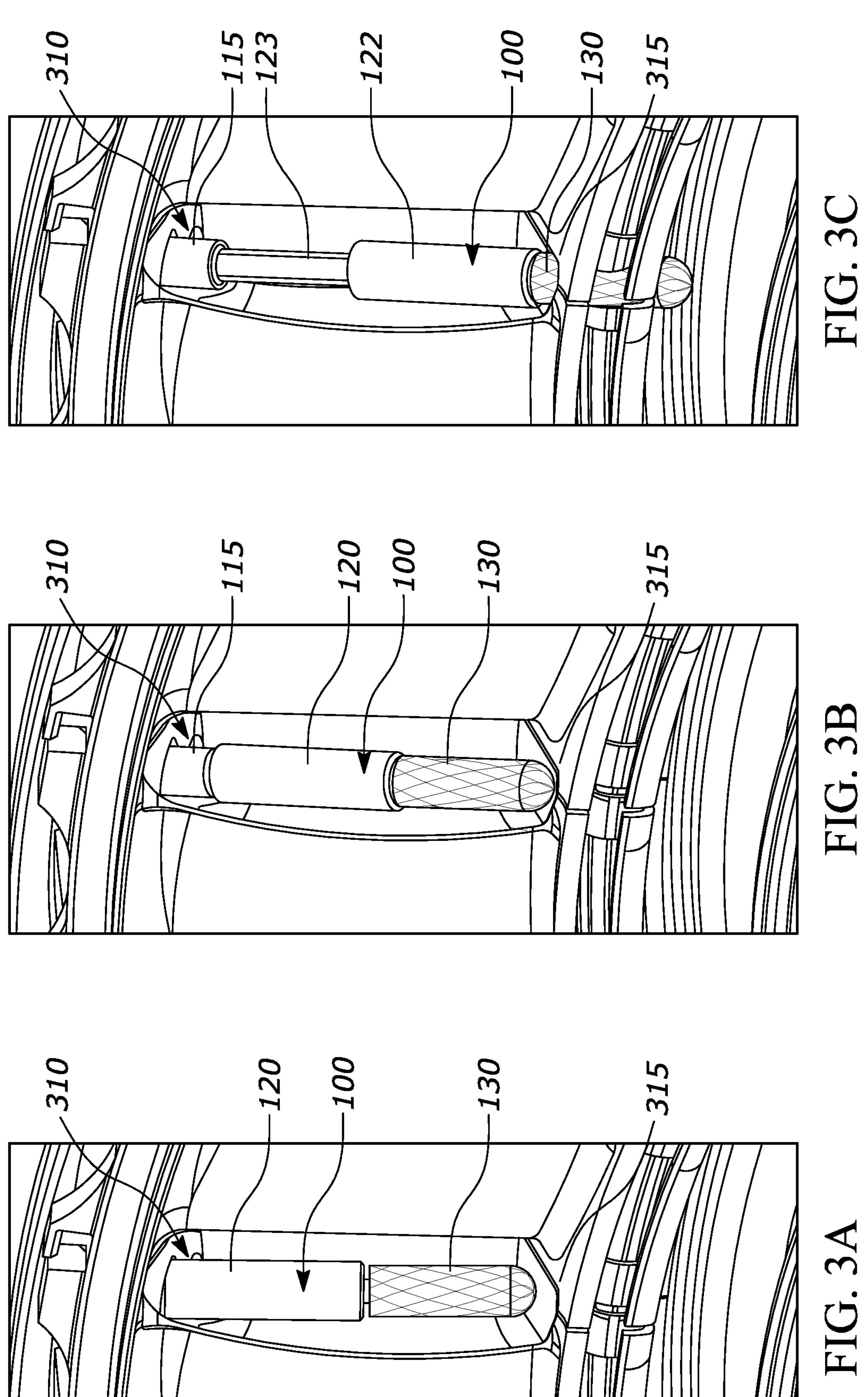
FIGS. 3A, 3B, and 3C are illustrations of an insertion tool in operation in a confined space in accordance with some embodiments.

Next referring to FIGS. 3A-C, an insertion tool in operation in a confined space in accordance with some embodiments is shown. In FIG. 3A, the distal end of the tool 100, including the telescoping link 120 and the end effector 130 is inserted into a confined space 310 such as the interior of an assembled turbine engine to service a workpiece 315, such as a rotor blade, a stator vane, or an inner shroud of an engine assembly. For example, the tool 100 may be inserted to brush, drill, grind, cut, polish, profile, blend, or clean the workpiece 315. In FIG. 3A, the tool 100 may be in the relaxed state while the telescoping link 120 is retracted as shown in FIGS. 2A and 2B.

In FIG. 3B, the joint 115 is actuated by the joint actuation assembly 140 (FIG. 1) to a select/predefined angle to position the end effector 130 relative to the workpiece 315. In FIG. 3B, the joint 115 may be rigidized and the telescoping link 120 may be retracted as shown in FIG. 2C. In some embodiments, the joint 115 is rigidized along with one or more segments 112 of the insertion portion 110 of the tool 100 as shown in FIG. 1 to form a predetermined angle.

In FIG. 3C, the telescoping link 120 (formed by base part 123 and extension part 122) is extended by an extension actuator 150 (FIG. 1) such that the extension part 122 slides towards the workpiece 315 from the joint 115. In FIG. 3C, the joint 115 may be rigidized and the telescoping link 120 may be extended as shown in FIG. 1. In some embodiments, the telescoping link 120 may be extended before the end effector 130 begins to rotate or while the end effector 130 is rotating to perform the operation. In FIG. 3C for example, the telescoping link 120 extends to push the end effector 130 through an opening (e.g., drill hole) in the workpiece 315 created by the end effector 130.

FIGS. 4A and 4B are cross-sectional views of a tool 100 with a connector tension controller 139 and a rigid tube 136 for controlling the tension of the end effector connector 135 during extension of the telescoping link 120. The rigid tube 136 is a tube that surrounds and is affixed to a portion of the end effector connector 135. The rigid tube 136 is configured to keep a minimum length of the end effector connector 135 outside of the insertion portion 110 and guide the actuation of the extension actuator 150. The rigid tube 136 may be inserted through a shaft collar 152 that serves as a mechanical stop and for positioning the rigid tube 136 and the end effector connector 135 outside of the insertion portion 110. When the length between shaft collar 152 and the end effector 130 changes as the telescoping link 120 telescopes, the connector tension controller 139 and the rigid tube 136 maintain the tension of the end effector connector 135 within the telescoping link 120 and insertion portion 110 so that the end effector connector 135 does not become jammed within the insertion portion 110 and telescoping link 120. The shaft collar 152 includes a thrust bearing 155 that allows the rotation of the end effector connector 135 and the rigid tube 136 within the shaft collar 152. Also shown in FIGS. 4A and 4B are a linear bearing 117 and end effector bearing 133 for facilitating the rotation of the end effector 130 by torque transmitted via the end effector connector 135 and rigid tube 136.

Referring back to FIG. 1, in some embodiments, the extension actuator 150, joint actuation assembly 140, and/or the end effector actuator 138 may be coupled to a controller 180. The controller 180 may be a processor-based control circuit such as a processor 181 that is configured to control the operation of the tool 100 based on computer executable codes stored in a computer readable storage memory 182. For example, the controller 180 may send signals to cause the insertion, insertion portion 110 rigidization, telescoping link 120 extension, and/or end effector 130 rotation in the tool 100. In some embodiments, the controller 180 may be a user-operated electronic user interface device or automated and/or semi-automated controller. In some embodiments, the controller 180 may be the controller of a snake arm robot.

FIGS. 7A to 12B illustrate several embodiments of an extension actuator 150 for actuating a telescoping link 120 of a tool 100. Generally, however, the telescoping may be actuated by any mechanism that is configured to cause the extension part 122 to extend relative to the base part 123. Elements described with reference to FIGS. 1-6 may not be repeated in the descriptions of these figures.

Figure 7A:
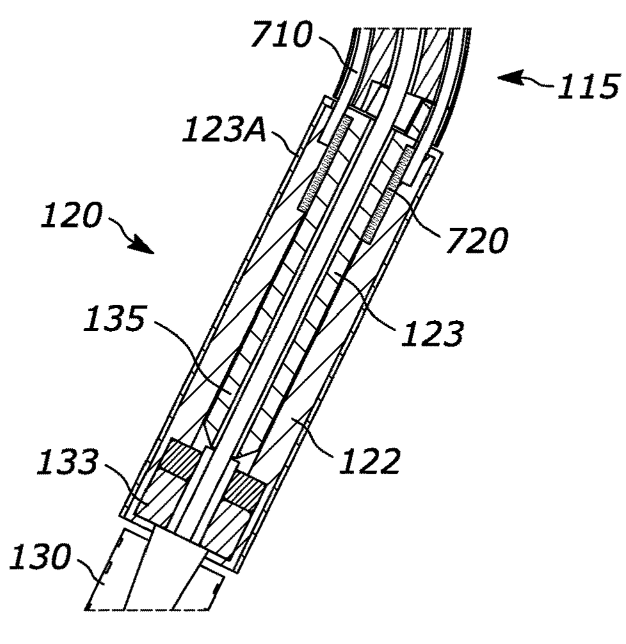
FIG. 7A and FIG. 7B are cross-sectional views of a telescoping link with a spring-loaded actuator according to some embodiments.
Figure 7B:
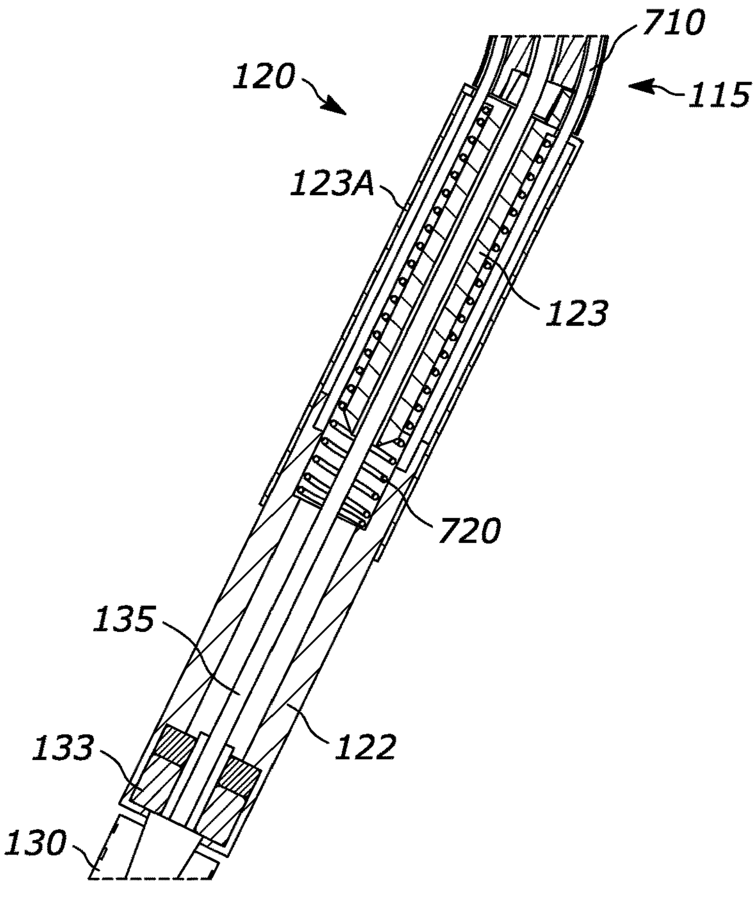

FIGS. 7A and 7B are cross-sectional views of a telescoping link 120 with a rope assembly extension actuator according to some embodiments. In the embodiment shown in FIGS. 7A and 7B, the extension actuator 150 of FIG. 1 includes a spring 720 and a rope assembly 710. The spring 720 is coupled between the base part 123 and the extension part 122 to assert a force that slides the extension part 122 away from the base part 123 into an extended state as shown in FIG. 7B. The rope assembly 710 is coupled to the extension part 122 and configured to apply tension between the extension part 122 and the base part 123 to compress the spring 720 thereby actuating the telescoping link 120 to the retracted state as shown in FIG. 7A. In some embodiments, the rope assembly 710 may be the rope assembly 145 (FIG. 1) for actuating the joint 115 and/or rigidizing the insertion portion 110 (FIG. 1), or a separate rope assembly. In some embodiments, the insertion portion 110 and the extension part 122 may include guide paths for the rope assembly 710 such that the rope assembly 710 may slide inside the insertion portion 110 and 121//. In some embodiments, the rope assembly 710 may share the same guide paths inside the insertion portion 110 with the rope assembly 145 or have separate guide path(s). FIGS. 7A and 7B also show the base part 123 with an anti-rotation feature including a sleeve 123A around a portion of the extension part 122, which is described in more detail with reference to FIG. 13A herein. Also shown in FIGS. 7A and 7B is the end effector 130 coupled to the end effector connector 135 and the extension part 122 via the effector bearing 133.

Figure 8A:
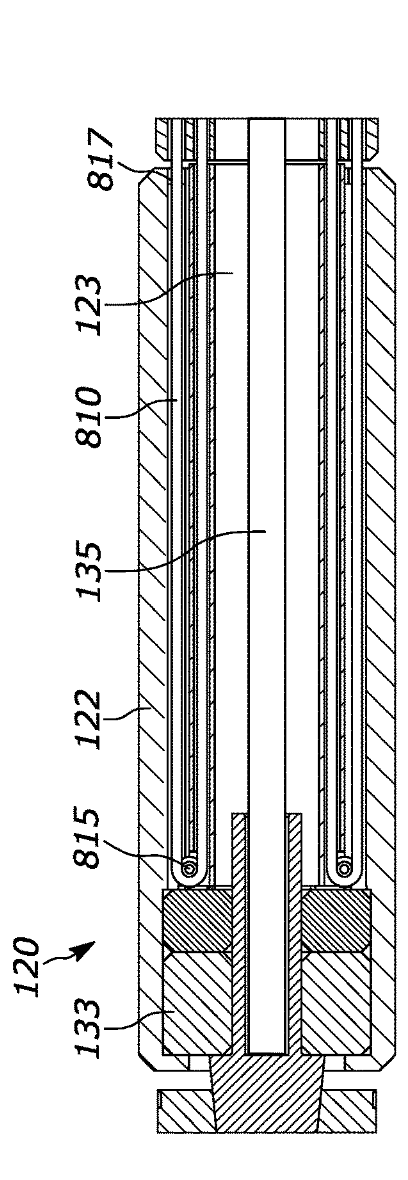
FIG. 8A and FIG. 8B are cross-sectional views of a telescoping link with an inverted rope extension actuator according to some embodiments.
Figure 8B:
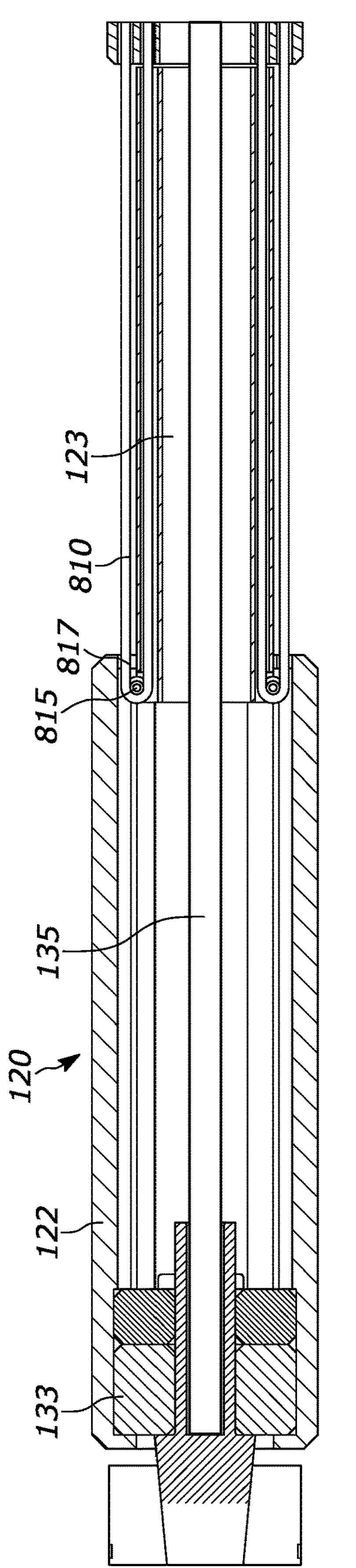

FIGS. 8A and 8B are cross-sectional views of a telescoping link 120 with an inverted rope assembly extension actuator according to some embodiments. In the embodiment shown in FIGS. 8A and 8B, the extension actuator 150 of FIG. 1 includes an inverted rope assembly 810 attached (e.g., clamped) to the extension part 122 at a point 817 and looped around one or more pulleys 815 on the base part 123. Applying a force to pull the inverted rope assembly 810 actuates the telescoping link 120 from the retracted state shown in FIG. 8A to the extended state shown in FIG. 8B. In some embodiments, the inverted rope assembly 810 may be the rope assembly 145 (FIG. 1) for rigidizing the insertion portion 110 (FIG. 1) or a separate rope assembly. In some embodiments, the insertion portion 110 may include guide paths for the inverted rope assembly 810 such that the inverted rope assembly 810 may slide inside the insertion portion 110 and extension part 122. In some embodiments, the inverted rope assembly 810 may share the same guide paths inside the insertion portion 110 with the rope assembly 145 or have separate guide path(s). Also shown in FIGS. 8A and 8B is the end effector 130 coupled to the end effector connector 135 and the extension part 122 via the effector bearing 133.

Figures 9A, 9B:
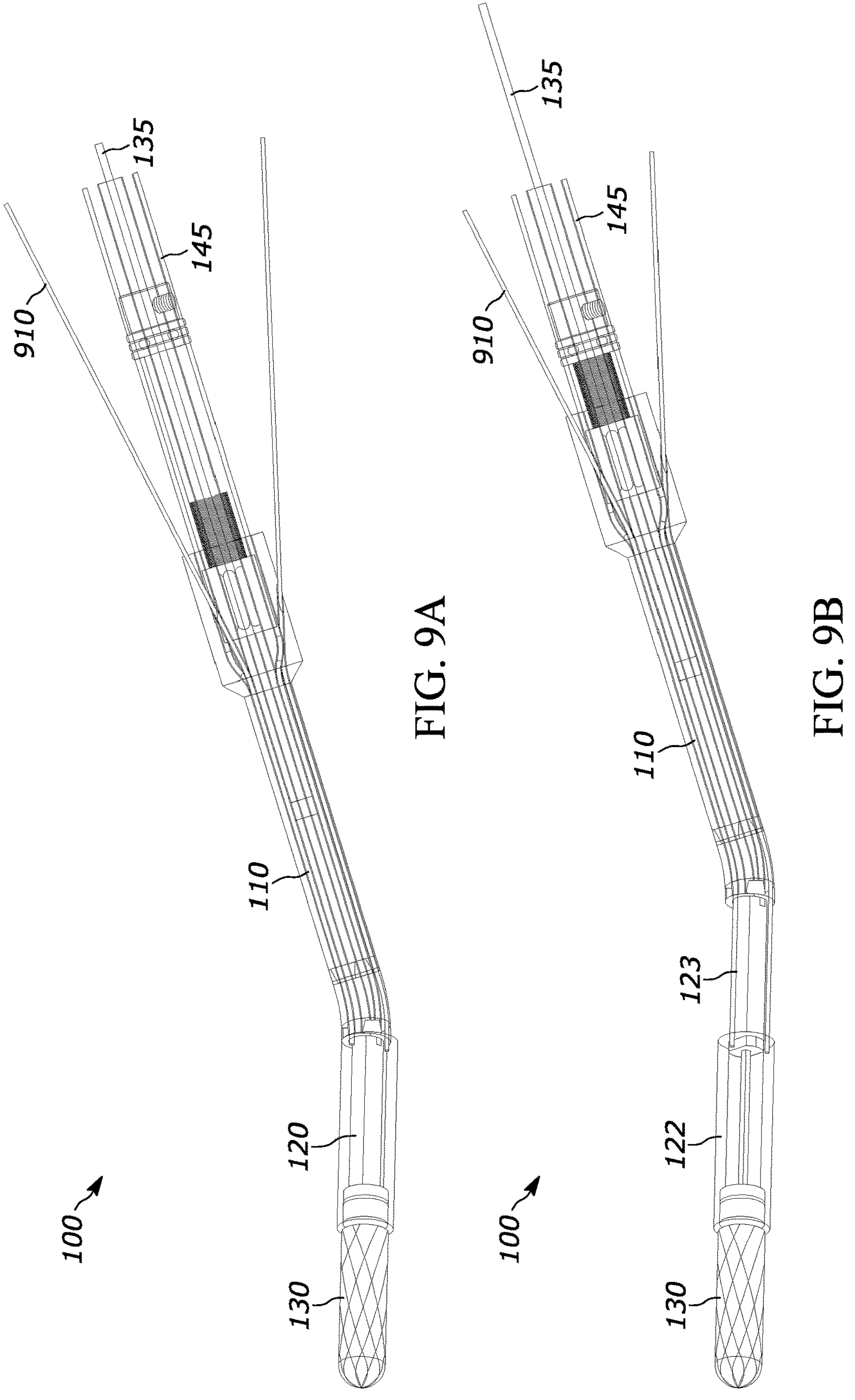
FIG. 9A and FIG. 9B are perspective views of an insertion tool with a wire extension actuator according to some embodiments.

FIGS. 9A and 9B are perspective views of a tool 100 with a wire assembly extension actuator for the telescoping link 120 according to some embodiments. In the embodiment shown in FIGS. 9A and 9B, the extension actuator 150 of FIG. 1 includes a wire assembly 910 that is inserted through the insertion portion 110 and the base part 123, and attached to the extension part 122 and/or the end effector 130. Pushing the wire assembly 910 into the insertion portion 110 and toward the distal end of the tool 100 actuates the telescoping link 120 from the retracted state shown in FIG. 9A to the extended state shown in FIG. 9B. In some embodiments, the wire assembly 910 includes a superelastic wire such as a Nitinol wire. In some embodiments, the wire assembly 910 includes one, two, three, four, or more wires. In some embodiments, in the insertion portion 110, the wire assembly 910 may be radially outward of the end effector connector 135. In some embodiments, the insertion portion 110 and the extension part 122 may include guide paths for wire assembly 910 such that the wire assembly 910 may slide inside the insertion portion 110 and the base part 123. In some embodiments, the wire assembly 910 may share the same guide paths inside the insertion portion 110 with the rope assembly 145 or have separate guide path(s).

Figure 10A:
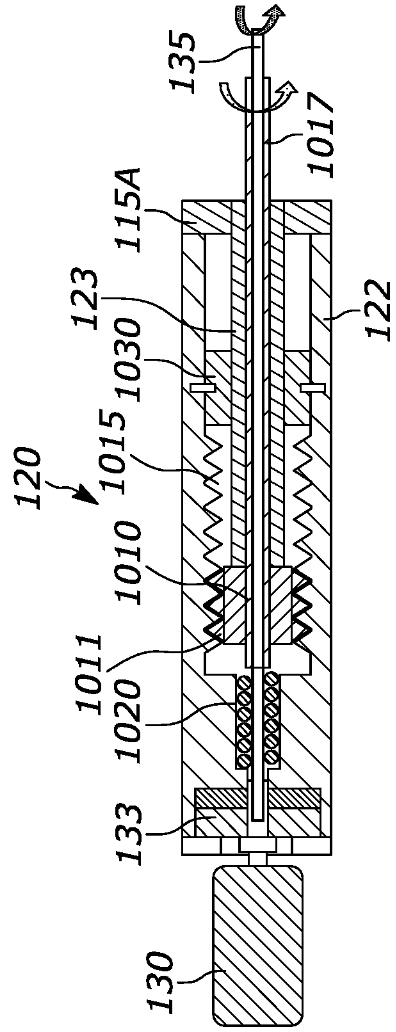
FIG. 10A and FIG. 10B are cross-sectional views of a telescoping link with a rotating element driven by a shaft in accordance with some embodiments.
Figure 10B:
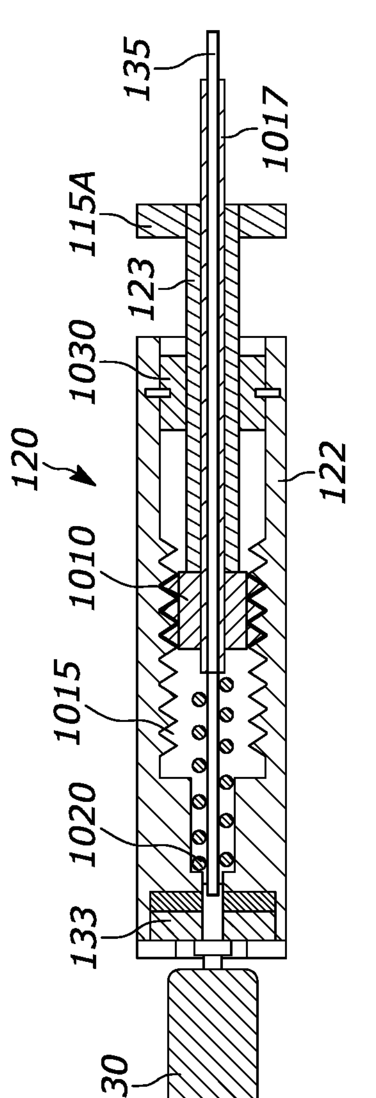

FIGS. 10A and 10B are cross-sectional views of a telescoping link 120 with a threaded interface extension actuator. In the embodiment shown in FIGS. 10A and 10B, the extension actuator 150 of FIG. 1 includes a rotation element 1010 coupled to the base part 123. The extension actuator 150 has a first threaded surface 1011 that is engaged (e.g., threaded with, meshed) with a second threaded surface 1015 on the extension part 122. In embodiments where the extension part 122 is at least partially nested within the extension part 122, and the rotation element 1010 may instead be coupled to the extension part 122.

The rotation element 1010 is configured to rotate relative to both the extension part 122 and the base part 123 while coupled to the base part 123. Rotation of the rotation element 1010 along the second threaded surface 1015 actuates the telescoping link 120 between the retracted state as shown in FIG. 10A and the extended state shown in FIG. 10B. The rotation of the rotation element 1010 may be driven by a connector guide 1017 around the end effector connector 135. The connector guide 1017 is inserted through the insertion portion 110, coupled to the rotation element 1010, and configured to rotate the rotation element 1010. In some embodiments, the telescoping link 120 may be without the connector guide 1017 and the end effector connector 135 is instead inserted through a hole in the rotation element 1010. The hole in the rotation element 1010 may have an inner friction surface contacting the end effector connector 135, such that the rotation of the end effector connector 135 rotates the rotation element 1010 via the inner friction surface to actuate the extension part.

The telescoping link 120 may further include a compression spring 1020 that supports the end effector connector 135 within the extension part 122, in the gap between the base part 123 and the end effector 130. Also shown in FIGS. 10A and 10*b*, are the effector bearing 133 within the extension part 122 and the first interface 115A of the joint 115. FIGS. 10A and 10B also show an anti-rotation feature 1030 that prevents the relative rotation of the extension part 122 and the base part 123. Further details of the anti-rotation feature 1030 are described with reference to FIG. 13C herein.

Figure 11A:
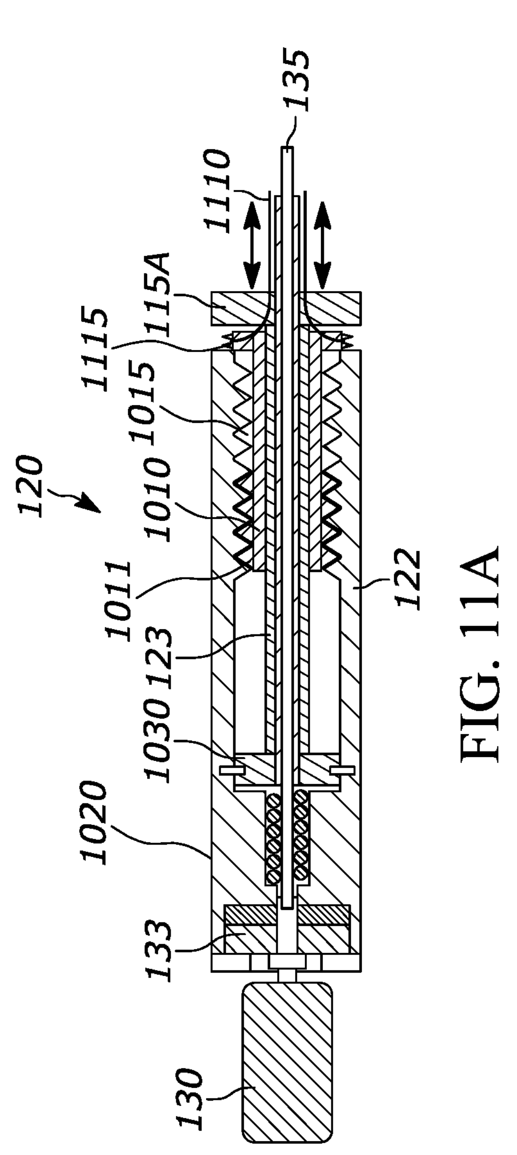
FIG. 11A and FIG. 11B are cross-sectional views of a telescoping link with a rotating element driven by a rope in accordance with some embodiments.
Figure 11B:
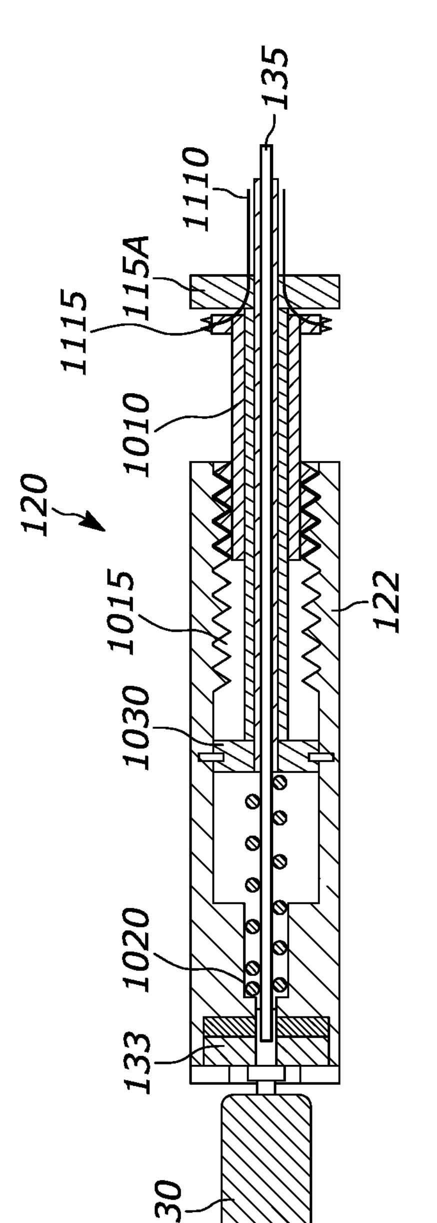

FIGS. 11A and 11B are cross-sectional views of a telescoping link 120 with a threaded interface extension actuator driven by a pull rope assembly 1110. The pull rope assembly 1110 includes a single rope looped around a spool 1115 on the rotation element 1010 such that pulling the pull rope assembly 1110 causes the rotation of the rotation element 1010 and the actuation of the telescoping link 120 between the retracted state shown in FIG. 11A and the extended state shown in FIG. 11B. In some embodiments, pulling on one end of the pull rope assembly 1110 causes the extension of the telescoping link 120 while pulling on the opposite end of the pull rope assembly 1110 causes the retraction of the telescoping link 120. In FIGS. 11A and 11B, the anti-rotation feature 1030 is towards the distal end of the base part 123 but serves generally the same function as the anti-rotation feature 1030 shown in FIGS. 10A and 10B which is positioned near the center or the proximal end of the extension part 122. Parts in FIGS. 11A and 11B that share the same number as those described with FIGS. 10A and 10B are generally the same or similar, and descriptions are not repeated herein.

Figure 12A:
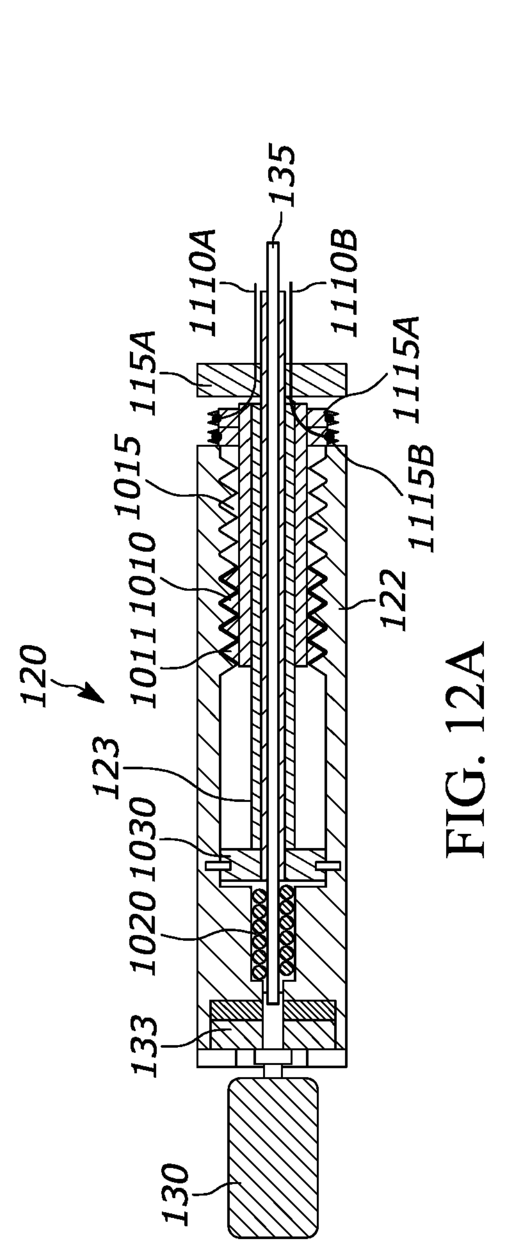
FIG. 12A and FIG. 12B are cross-sectional views of a telescoping link with a rotating element driven by two ropes in accordance with some embodiments.
Figure 12B:
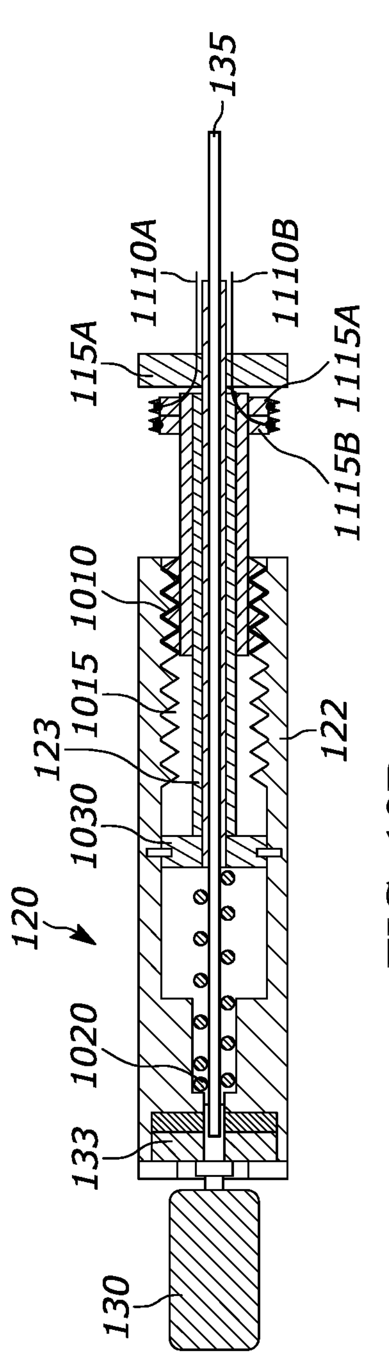

FIGS. 12A and 12B are cross-sectional views of a telescoping link 120 with a threaded interface extension actuator driven by a two-rope assembly. The rope assembly includes a first rope assembly 1110A looped around a first spool 1115A in the first direction and a second rope 1110B looped around a second spool 1115B of the rotation element 1010 in the second direction. When the first rope assembly 1110A is pulled, the telescoping link 120 may be retracted as shown in FIG. 12A and when the second rope 1110B is pulled, the telescoping link 120 may be extended as shown in FIG. 12B.

Parts in FIGS. 12A and 12B that share the same number as those described with FIGS. 10A and 10B are generally the same or similar, and descriptions are not repeated herein.

Figure 13A:
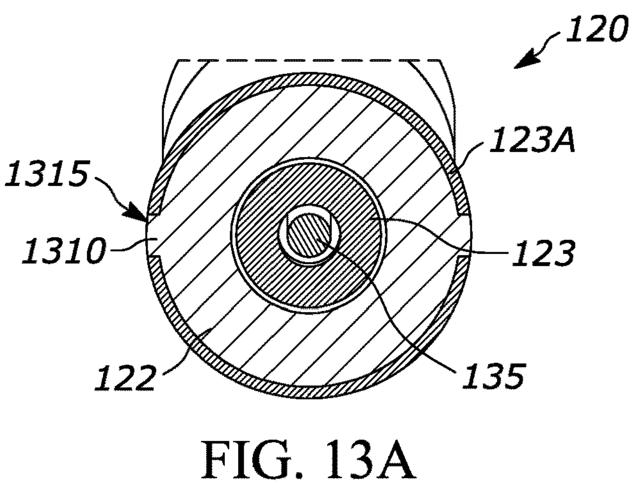
FIGS. 13A, 13B, and 13C, are cross-sectional views of anti-rotation features in accordance with some embodiments.
Figure 13B:
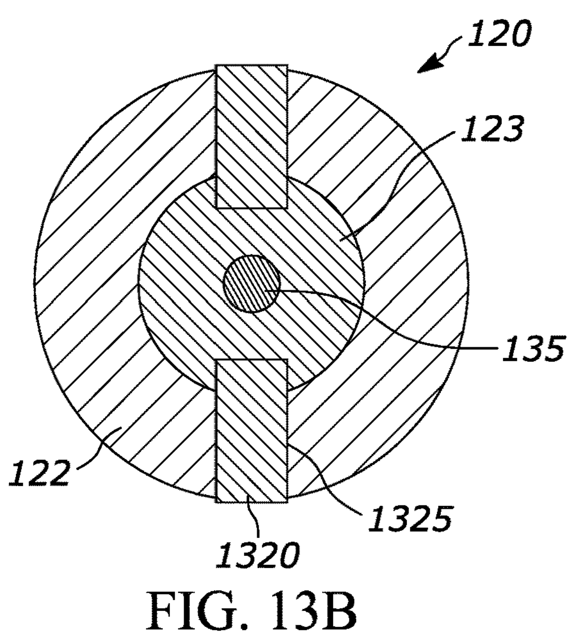
Figure 13C:
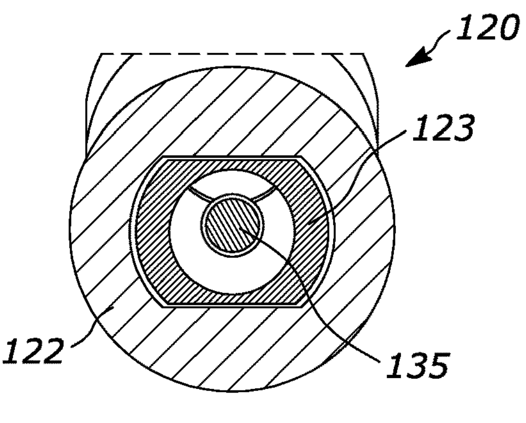

FIGS. 13A-13C are cross-sectional views of several embodiments of an anti-rotation feature that may be implemented on the extension part 122 and the base part 123 of the telescoping link 120. FIGS. 13A-13C further shows a end effector connector 135 inserted through the extension part 122 and the base part 123. FIGS. 13A-13C are provided as examples only, and the anti-rotation feature may be variously implemented to prevent relative rotation between the extension part 122 and base part 123.

In the embodiment illustrated in FIG. 13A, the anti-rotation feature includes a tab and slot interface, including a tab 1310 on the extension part 122 and a slot 1315 on the base part 123. In FIG. 13A, the base part 123 includes a sleeve 123A around the extension part 122. The extension part 122 has a raised tab 1310 extending in the axial direction of the telescoping link 120 while the sleeve 123A includes a corresponding longitudinal slot 1315. The tab and slot pair allow the extension part 122 and base part 123 to slide longitudinally along the axis of the telescoping link 120 but limit the rotation between the two parts. In some embodiments, the telescoping link 120 may include one, two, three or more pairs of tabs and slots around the telescoping link 120.

In the embodiment illustrated in FIG. 13B, the anti-rotation feature includes a tab 1320 on the base part 123 and a slot 1325 on the extension part 122. In some embodiments, the slot 1325 extends to the outer surface of the extension part 122. In some embodiments, the slot 1325 is a groove on the inner surface of the extension part 122. In some embodiments, the tab 1320 may be a movable key and the anti-rotation feature includes a key and keyway interface that may be selectively engaged to limit the rotation between the base part 123 and the extension part 122.

In the embodiment illustrated in 13C, the anti-rotation feature includes the shape of the extension part 122 and the opening of the base part 123 that receives the extension part 122. For example, at least a section of interface surfaces of the base part 123 and extension part 122 is non-cylindric with a non-circular cross-section. For example, the inner surface of the extension part 122 and the outer surface of the base part 123 include one or more linear portions that prevent the rotation of the extension part 122 relative to the base part 123. In some embodiments, the cross-section profile of the interface surfaces may be rectangular, triangular, polygonal, cross-shaped, etc.

Figure 14:
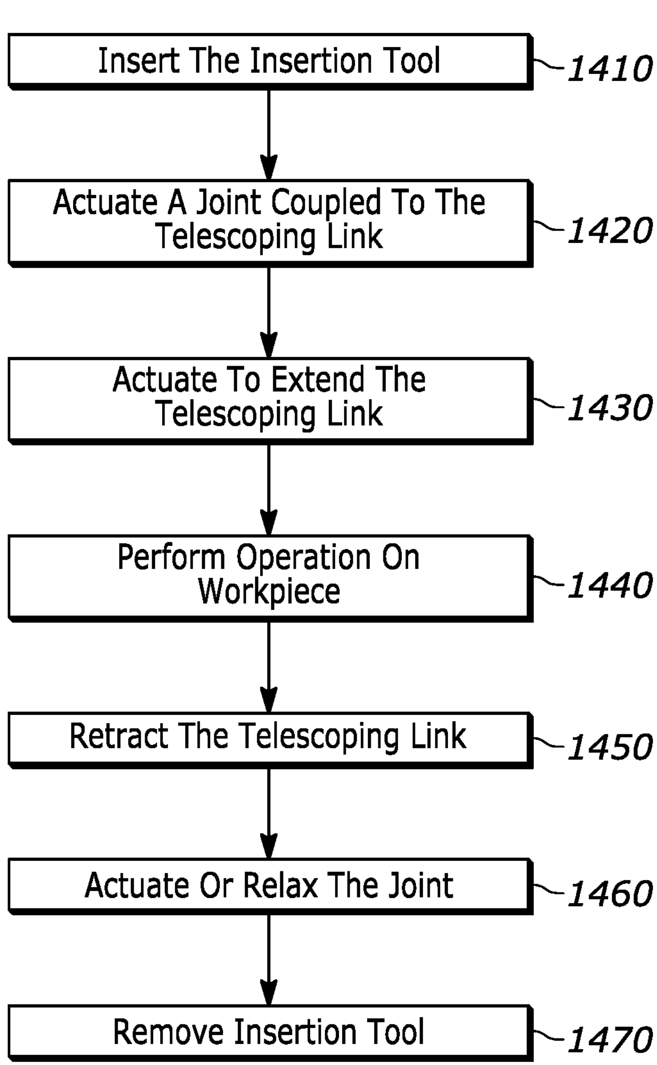
FIG. 14 is a flow diagram of a process of performing an operation with an insertion tool with a telescoping link in accordance with some embodiments.

FIG. 14 shows a method 1400 for operating an insertion tool 100 according to some embodiments. In some embodiments, one or more steps of FIG. 14 may be executed by a control circuit of the tool 100 such as a process-based device executing computer-readable codes stored on a memory storage device. For example, one or more steps may be executed by the controller of a snake arm robot. In some embodiments, one or more steps of FIG. 14 may be performed by a human operator. For example, one or more steps may be performed by manually actuating a mechanical, electrical, pneumatic, and/or hydraulic switch/trigger. In some embodiments, the method 1400 may be performed by a combination of control circuit executed steps and human operator executed steps.

In step 1410, the insertion tool 100 is inserted into a confined space towards an intended workpiece 315. In step 1410, the insertion portion 110 and/or the extension actuator 150 may be in a relaxed/flexible state to allow for the insertion of tool 100 through complex pathways, and the telescoping link 120 may be retracted for maneuverability through the complex pathway.

In step 1420, when the end effector 130 of the tool 100 is near the workpiece 315, such as shown in FIG. 3A, the extension actuator 150 is actuated by the joint actuation assembly 140 to change the angle between the telescoping link 120 and the insertion portion 110. In some embodiments, the joint actuation assembly 140 applies tension to rigidize the joint extension actuator 150. In some embodiments, the joint actuation assembly 140 is actuated to a predetermined angle. In some embodiments, after step 1420, a connector tension controller 139 acts on the end effector connector 135 to maintain the tension of the end effector connector 135 within the insertion portion 110.

In step 1430, the extension actuator 150 actuates the telescoping link 120 to extend the telescoping link 120. In some embodiments, the connector tension controller 139 may reduce the tension in the end effector connector 135 to allow for the extension of the telescoping link 120.

In step 1440, the tool 100 begins to perform operations on the workpiece with the joint 115 actuated to a predetermined angle and/or rigidized, and the telescoping link 120 at least partially extended. In some embodiments, the end effector connector 135 transmits torque from an end effector actuator 138 to cause the rotation of the end effector 130 to perform the operation. In some embodiments, the operation may include brushing, drilling, grinding, cutting, polishing, profiling, blending, and/or cleaning the workpiece. In some embodiments, the extension actuator 150 may continue to cause the extension of the telescoping link 120 during step 1440. For example, the telescoping link 120 may extend to allow a drill to continue drilling deeper through a hole.

Upon completion of the operation, in step 1450, the telescoping link 120 is retracted by the extension actuator 150. In some embodiments, step 1450 may be omitted, and the telescoping link may be removed in the extended state. In step 1460, the extension actuator 150 is actuated to a different angle and/or relaxed by the joint actuation assembly 140 to allow for removal of the tool through the complex insertion path. In some embodiments, the insertion portion 110 is also unrigidized in step 1460. In step 1470, the insertion tool 100 is removed from the device being serviced through the compFlex path.

An insertion tool 100 with a telescoping link 120 as described herein allows for an additional axis of motion control for both reaching a target workpiece and for adjusting the position of the end effector 130 during operation, thereby improving the maneuverability and precision control of an insertion tool 100 for complex operations in confined spaces, such as serving and repairs of assembled turbine engines.

Further aspects of the disclosure are provided by the subject matter of the following clauses:

An insertion tool includes an insertion portion; a telescoping link, the telescoping link having a base part and an extension part, the extension part being configured to slide longitudinally relative to the base part from a retracted state to an extended state; a joint actuation assembly configured to change an angle between the base part of the telescoping link and the insertion portion via a joint; and an extension actuator configured to actuate the extension part of the telescoping link from the retracted state to the extended state.

The insertion tool of any of the preceding clauses, further including: an end effector on the extension part.

The insertion tool of any of the preceding clauses, wherein the end effector includes one or more of a brush, a drill, a burr, a grinding tool, a cutting tool, a polishing tool, a profiling tool, a bore-blending tool, a cleaning tool, an imaging tool, an eddy current imager, or an ultrasound imager.

The insertion tool of any of the preceding clauses, further including: an end effector connector coupled to the end effector and inserted through a first hole in the insertion portion and a second hole in the telescoping link.

The insertion tool of any of the preceding clauses, wherein the end effector connector includes a flexible shaft for selectively transmitting torque to the end effector.

The insertion tool of any of the preceding clauses, wherein the end effector connector includes one or more of a fiber-optic cable, a fluid tube, or an electrical wire connector.

The insertion tool of any of the preceding clauses, further including a connector tension controller for affecting a tension of the end effector connector within the insertion portion and the telescoping link.

The insertion tool of any of the preceding clauses, wherein the connector tension controller includes one or more of a spring-loaded mechanism, a linear motor, a pneumatic artificial muscle device, or a piezo-electric motor.

The insertion tool of any of the preceding clauses, wherein the telescoping link includes a spring around the end effector connector for supporting the end effector connector in a gap between the base part and the extension part when the telescoping link is in the extended state.

The insertion tool of any of the preceding clauses, wherein the joint includes one or more flexible elements or hinges.

The insertion tool of any of the preceding clauses, wherein the insertion portion includes one or more rigidizable segments, and the joint actuation assembly is configured to tension the one or more rigidizable segments of the insertion portion to a predefined shape.

The insertion tool of any of the preceding clauses, wherein the insertion portion includes a rigidizable guide tube or a snake arm robot.

The insertion tool of any of the preceding clauses, the joint including a first interface of the base part of the telescoping link and a second interface on the insertion portion, wherein when the first interface and the second interface are engaged, the joint limits a relative motion of the base part of the telescoping link and the insertion portion.

The insertion tool of any of the preceding clauses, wherein the joint actuation assembly is configured to position the telescoping link at a predefined angle relative to the insertion portion.

The insertion tool of any of the preceding clauses, wherein the joint is configured to enable the telescoping link to move in one, two or three degrees of freedom of movement relative to the insertion portion.

The insertion tool of any of the preceding clauses, wherein the base part has a smaller outer diameter as compared to the extension part, and the base part is at least partially nested within the extension part in the retracted state.

The insertion tool of any of the preceding clauses, wherein the base part has a larger outer diameter as compared to the extension part, and the extension part is at least partially nested within the base part in the retracted state.

The insertion tool of any of the preceding clauses, wherein the telescoping link is linear or curved.

The insertion tool of any of the preceding clauses, wherein the telescoping link includes an anti-rotation feature to limit a rotation of the extension part relative to the base part.

The insertion tool of any of the preceding clauses, wherein the anti-rotation feature includes one or more of a non-cylindrical contact surface, a key and keyway interface, or a tab and rail interface.

The insertion tool of any of the preceding clauses, wherein the telescoping link includes a plurality of extension parts each configured to slide and extend out of the base part or another extension part.

The insertion tool of any of the preceding clauses, wherein the extension actuator includes: a rigid tube affixed to a portion of an end effector connector inserted through the insertion portion.

The insertion tool of any of the preceding clauses, wherein the extension actuator includes: a spring element coupled between the base part and the extension part; and a rope assembly coupled to the extension part and configured to compress the spring element to actuate the telescoping link to the retracted state.

The insertion tool of any of the preceding clauses, wherein the extension actuator includes: an inverted rope assembly attached to the extension part and looped around one or more pulleys on the base part; wherein applying a pull force on the inverted rope assembly actuates the extension part to the extended state.

The insertion tool of any of the preceding clauses, wherein the extension actuator includes: a wire assembly inserted through the insertion portion and the telescoping link, and coupled to the extension part; wherein pushing the wire assembly into the insertion portion actuates the telescoping link into the extended state.

The insertion tool of any of the preceding clauses, wherein the wire assembly includes one or more superelastic wires or one or more Nitinol wires.

The insertion tool of any of the preceding clauses, wherein the extension actuator includes: a rotation element with a first threaded surface that engages a second threaded surface on one of the base part and the extension part; wherein the rotation element is configured to rotate relative to the base part and the extension part; and wherein a rotation of the rotation element along the second threaded surface actuates the extension part of the telescoping link from the retracted state to the extended state.

The insertion tool of any of the preceding clauses, wherein the extension actuator further including: a connector guide around an end effector connector; wherein the connector guide is coupled to the rotation element and configured to rotate the rotation element.

The insertion tool of any of the preceding clauses, wherein the insertion tool further includes an end effector connector inserted through the rotation element via a hole in the rotation element; wherein the hole has an inner friction surface contacting the end effector connector, such that the rotation of the end effector connector rotates the rotation element via the inner friction surface to actuate the extension part.

The insertion tool of any of the preceding clauses, wherein the extension actuator further includes a rope assembly for causing the rotation of the rotation element, the rope assembly include a first rope looped around the rotation element in a first direction when the telescoping link in in the retracted state.

The insertion tool of any of the preceding clauses, wherein the rope assembly includes a second rope looped around the rotation element in a second direction opposite the first direction.

The insertion tool of any of the preceding clauses, wherein the extension actuator includes at least a portion that runs through to the insertion portion, and the extension actuator is controlled via an extension actuation interface at the proximal end of the insertion portion.

The insertion tool of any of the preceding clauses, wherein the joint actuator assembly includes a tensioning assembly configured to apply a first force to the base part in a first direction and the extension actuator is configured to apply a second force to the base part via the extension part in a second direction opposite the first direction.

A method for operating an insertion tool includes inserting the insertion tool into a confined space, the insertion tool including an insertion portion and a telescoping link having a base part and an extension part configured to slide longitudinally relative to the base part; actuating, via a joint actuation assembly of the insertion tool, a joint between the base part of the telescoping link and the insertion portion to change an angle between the base part of the telescoping link and the insertion portion, and actuating, via an extension actuator of the insertion tool, the base part of the telescoping link from a retracted state to an extended state.

The method of any of the preceding clauses, wherein the insertion tool further includes an end effector on the extension part.

The method of any of the preceding clauses, wherein the end effector includes one or more of a brush, a drill, a burr, a grinding tool, a cutting tool, a polishing tool, a profiling tool, a bore-blending tool, a cleaning tool, an imaging tool, an eddy current imager, or an ultrasound imager.

The method of any of the preceding clauses, wherein the tool further includes: an end effector connector coupled to the end effector and inserted through a first hole in the insertion portion and a second hole in the telescoping link.

The method of any of the preceding clauses, wherein the end effector connector includes a flexible shaft for selectively transmitting torque to the end effector.

The method of any of the preceding clauses, wherein the end effector connector includes one or more of a fiber-optic cable, a fluid tube, or an electrical wire connector.

The method of any of the preceding clauses, further including affecting, via a connector tension controller, a tension of the end effector connector within the insertion portion and the telescoping link.

The method of any of the preceding clauses, wherein the connector tension controller includes one or more of a spring-loaded mechanism, a linear motor, a pneumatic artificial muscle device, or a piezo-electric motor.

The method of any of the preceding clauses, wherein the telescoping link includes a spring around the end effector connector for supporting the end effector connector in a gap between the base part and the extension part when the telescoping link is in the extended state.

The method of any of the preceding clauses, wherein the joint includes one or more flexible elements or hinges.

The method of any of the preceding clauses, wherein the insertion portion includes one or more rigidizable segments, and the joint actuation assembly is configured to tension the one or more rigidizable segments of the insertion portion to a predefined shape.

The method of any of the preceding clauses, wherein the insertion portion includes a rigidizable guide tube or a snake arm robot.

The method of any of the preceding clauses, the joint including a first interface of the base part of the telescoping link and a second interface on the insertion portion, wherein when the first interface and the second interface are engaged, the joint limits a relative motion of the base part of the telescoping link and the insertion portion.

The method of any of the preceding clauses, wherein the joint actuation assembly is configured to position the telescoping link at a predefined angle relative to the insertion portion.

The method of any of the preceding clauses, wherein the joint is configured to enable the telescoping link to move in one, two or three degrees of freedom of movement relative to the insertion portion.

The method of any of the preceding clauses, wherein the base part has a smaller outer diameter as compared to the extension part, and the base part is at least partially nested within the extension part in the retracted state.

The method of any of the preceding clauses, wherein the base part has a larger outer diameter as compared to the extension part, and the extension part is at least partially nested within the base part in the retracted state.

The method of any of the preceding clauses, wherein the telescoping link is linear or curved.

The method of any of the preceding clauses, wherein the telescoping link includes an anti-rotation feature to limit a rotation of the extension part relative to the base part.

The method of any of the preceding clauses, wherein the anti-rotation feature includes one or more of a non-cylindrical contact surface, a key and keyway interface, or a tab and rail interface.

The method of any of the preceding clauses, wherein the telescoping link includes a plurality of extension parts each configured to slide and extend out of the base part or another extension part.

The method of any of the preceding clauses, wherein the extension actuator includes: a rigid tube affixed to a portion of an end effector connector inserted through the insertion portion.

The method of any of the preceding clauses, wherein the extension actuator includes: a spring element coupled between the base part and the extension part; and a rope assembly coupled to the extension part and configured to compress the spring element to actuate the telescoping link to the retracted state.

The method of any of the preceding clauses, wherein the extension actuator includes: an inverted rope assembly attached to the extension part and looped around one or more pulleys on the base part; wherein applying a pull force on the inverted rope assembly actuates the extension part to the extended state.

The method of any of the preceding clauses, wherein the extension actuator includes: a wire assembly inserted through the insertion portion and the telescoping link, and coupled to the extension part; wherein pushing the wire assembly into the insertion portion actuates the telescoping link into the extended state.

The method of any of the preceding clauses, wherein the wire assembly includes one or more superelastic wires or one or more Nitinol wires.

The method of any of the preceding clauses, wherein the extension actuator includes: a rotation element with a first threaded surface that engages a second threaded surface on one of the base part and the extension part; wherein the rotation element is configured to rotate relative to the base part and the extension part; and wherein a rotation of the rotation element along the second threaded surface actuates the extension part of the telescoping link from the retracted state to the extended state.

The method of any of the preceding clauses, wherein the extension actuator further includes: a connector guide around an end effector connector; wherein the connector guide is coupled to the rotation element and configured to rotate the rotation element.

The method of any of the preceding clauses, wherein the insertion tool further includes an end effector connector inserted through the rotation element via a hole in the rotation element; wherein the hole has an inner friction surface contacting the end effector connector, such that the rotation of the end effector connector rotates the rotation element via the inner friction surface to actuate the extension part.

The method of any of the preceding clauses, wherein the extension actuator further includes a rope assembly for causing the rotation of the rotation element, the rope assembly include a first rope looped around the rotation element in a first direction when the telescoping link in in the retracted state.

The method of any of the preceding clauses, wherein the rope assembly includes a second rope looped around the rotation element in a second direction opposite the first direction.

The method of any of the preceding clauses, wherein the extension actuator includes at least a portion that runs through to the insertion portion, and the extension actuator is controlled via an extension actuation interface at the proximal end of the insertion portion.

The method of any of the preceding clauses, wherein the joint actuator assembly includes a tensioning assembly configured to apply a first force to the base part in a first direction and the extension actuator is configured to apply a second force to the base part via the extension part in a second direction opposite the first direction.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An insertion tool comprising:

an insertion portion;

a telescoping link, the telescoping link having a base part and an extension part, the extension part being configured to slide longitudinally relative to the base part from a retracted state to an extended state;

a joint actuation assembly configured to change an angle between the base part of the telescoping link and the insertion portion via a joint; and an extension actuator configured to actuate the extension part of the telescoping link from the retracted state to the extended state;

wherein the extension actuator comprises:

a rotation element with a first threaded surface that engages a second threaded surface on one of the base part and the extension part;

wherein the rotation element is configured to rotate relative to the base part and the extension part; and wherein a rotation of the rotation element along the second threaded surface actuates the extension part of the telescoping link from the retracted state to the extended state.

2. The insertion tool of claim 1, further comprising an end effector on the extension part.

3. The insertion tool of claim 2, wherein the end effector comprises one or more of a brush, a drill, a burr, a grinding tool, a cutting tool, a polishing tool, a profiling tool, a bore-blending tool, a cleaning tool, an imaging tool, an eddy current imager, or an ultrasound imager.

4. The insertion tool of claim 2, further comprising an end effector connector coupled to the end effector and inserted through a first hole in the insertion portion and a second hole in the telescoping link.

5. The insertion tool of claim 4, further comprising a connector tension controller for affecting a tension of the end effector connector within the insertion portion and the telescoping link.

6. The insertion tool of claim 4, wherein the telescoping link comprises a spring around the end effector connector for supporting the end effector connector in a gap between the base part and the extension part when the telescoping link is in the extended state.

7. The insertion tool of claim 1, wherein the telescoping link comprises an anti-rotation feature to limit a rotation of the extension part relative to the base part.

8. The insertion tool of claim 7, wherein the anti-rotation feature comprises one or more of a non-cylindrical contact surface, a key and keyway interface, or a tab and slot interface.

9. The insertion tool of claim 1, wherein the extension actuator further comprises:

a connector guide around an end effector connector;

wherein the connector guie is coupled to the rotation element and configured to rotate the rotation element.

10. The insertion tool of claim 1, wherein the insertion tool further comprises an end effector connector inserted through the rotation element via a hole in the rotation element;

wherein the hole has an inner friction surface contacting the end effector connector, such that the rotation of the end effector connector rotates the rotation element via the inner friction surface to actuate the extension part.

11. The insertion tool of claim 1, wherein the extension actuator further comprises a rope assembly for causing the rotation of the rotation element, the rope assembly comprise a first rope looped around the rotation element in a first direction when the telescoping link in in the retracted state.

12. The insertion tool of claim 11, wherein the rope assembly comprises a second rope looped around the rotation element in a second direction opposite the first direction.

13. An insertion tool comprising:

an insertion portion;

a telescoping link, the telescoping link having a base part and an extension part, the extension part being configured to slide longitudinally relative to the base part from a retracted state to an extended state;

a joint actuation assembly configured to change an angle between the base part of the telescoping link and the insertion portion via a joint; and an extension actuator configured to actuate the extension part of the telescoping link from the retracted state to the extended state;

wherein the extension actuator comprises:

a rigid tube affixed to a portion of an end effector connector inserted through the insertion portion.

14. A method for operating an insertion tool comprising:

inserting the insertion tool into a confined space, the insertion tool comprising an insertion portion, a joint actuation assembly, an extension actuator and a telescoping link having a base part and an extension part configured to slide longitudinally relative to the base part from a retracted state to an extended state, wherein the insertion portion comprises one or more rigidizable segments forming a rigidizable guide tube extending from a proximal end to a distal end, wherein the extension actuator comprises a rigid tube affixed to a portion of an end effector connector inserted through the insertion portion;

actuating, via the joint actuation assembly of the insertion tool, a joint between the base part of the telescoping link and the insertion portion to change an angle between the base part of the telescoping link and the insertion portion; and actuating, via an extension actuator of the insertion tool, the base part of the telescoping link from a retracted state to an extended state;

wherein the joint actuation assembly further tensions the one or more rigidizable segments of the insertion portion to a predefined shape; and wherein the joint comprises a first interface of the base part of the telescoping link and a second interface on the insertion portion, and when the first interface and the second interface are engaged by via tension, the joint limits a relative motion between the base part of the telescoping link and the insertion portion.

* * * * *